United States Patent Office 3,113,422
Patented Dec. 10, 1963

3,113,422
DISPIRANE HYDROCARBONS AS NEW COMPOUNDS AND USE AS HIGH ENERGY FUELS
Robert J. Wineman, Concord, Mass., assignor, by mesne assignments, to Monsanto Research Corporation, Everett, Mass., a corporation of Delaware
No Drawing. Filed Sept. 21, 1960, Ser. No. 57,404
7 Claims. (Cl. 60—35.4)

This invention relates to tricyclic dispirane hydrocarbons. In one aspect, this invention relates to dispirane hydrocarbons having an odd number of carbon atoms as new compounds. In another aspect, this invention relates to methods for preparing dispirane hydrocarbons having an odd number of carbon atoms. In another aspect, this invention relates to high energy fuel compositions for use in reaction type power plants. In another aspect, this invention relates to improved methods of developing thrust. In another aspect, this invention relates to methods of operating reaction type power plants, such as jet-propulsion type engines, including rocket, ram-jet, pulse-jet, and turbo-jet engines, and turbine type engines, including turbo-prop and gas turbine engines.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engines, exhaustion of the high temperature gases is directed in a rearward direction to produce a true jet-propulsion. In a turbine type engine, such as a gas turbine or a turbo-prop engine, the exhaustion of the high temperature gases is directed into a turbine which drives a propeller or other mechanical means for developing a forward thrust. Reaction type power plants may be used in widely different types of vehicles such as in space ships, aircraft, boats, guided missiles, automobiles and the like.

Heretofore, it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at a temperature at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis or high B.t.u./lb. but also a high energy level on a volume basis or a high B.t.u./gal. since wing sections are being made thinner in order to reduce the drag and space for storage for fuel is limited. Thus, aircraft are often volume limited as well as weight limited for fuel storage. Aircraft are particularly volume limited using the currently available JP-6 high energy fuel which has a heat of combustion of 18,400 B.t.u./lb. on a weight basis but a heat of combustion of only 119,500 B.t.u./gal. on a volume basis. Therefore, it is very desirable to provide a high energy fuel having a high heat of combustion on a volume basis, preferably greater than 120,000 B.t.u./gal., and at the same time obtain the other characteristics necessary for a good fuel of this type.

Another disadvantage of the presently known fuels is that they have high vapor pressures and tend to flash-off rapidly in power plants operated at high elevations and high temperatures, thereby resulting in an appreciable loss of fuel. Although this difficulty can be overcome by pressurizing fuel tanks, the structural strength of the fuel tanks must also be increased, adding to the weight and volume of the vehicle. Thus, present day aircraft using the current JP-6 fuel are both altitude limited and speed limited because such fuel has a boiling point in the range of 300° F. to 350° F. It is desirable that a fuel have a boiling point at least about 400° F. in order to overcome these limitations.

An object of this invention is to provide dispirane hydrocarbons having an odd number of carbon atoms as new compounds.

Another object of this invention is to provide methods for preparing the dispirane hydrocarbons having an odd number of carbon atoms.

Another object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet, and pulse-jet engines, and turbine type engines including turbo-prop and gas turbine engines.

Other aspects, objects and advantages of this invention will be apparent from a consideration of the accompanying disclosure and the appended claims.

According to the present invention, there are provided, as new compounds, dispirane hydrocarbons having an odd number of carbon atoms, preferably dispirane hydrocarbons of the formula

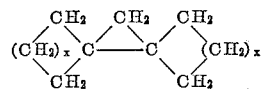

wherein $x$ is a whole number of from 1 to 3 inclusive.

Also, according to the present invention, there are provided methods for producing dispirane hydrocarbons having an odd number of carbon atoms, preferably dispirane hydrocarbons as defined above, by condensing two moles of cycloalkyl ketone in the presence of a group II and/or group III metal catalyst to form a 1,1'-dihydroxybicycloalkyl, reacting the 1,1'-dihydroxybicycloalkyl with an inorganic halide to form a 1,1'-dihalobicycloalkyl, dehalogenating the 1,1'-dihalobicycloalkyl in the presence of a group II metal catalyst to form a biscycloalkylidene, and carbenating the biscycloalkylidene with methylene iodide using a zinc-copper couple to form a dispirane hydrocarbon having an odd number of carbon atoms.

Also, according to the present invention, there are provided high energy fuel compositions comprising, as an essential ingredient, a dispirane hydrocarbon having an odd number of carbon atoms, preferably a dispirane hydrocarbon as defined above.

Also, according to the present invention, there are provided improved methods of developing thrust, said methods comprising oxidizing a high energy fuel composition comprising, as an essential ingredient, a dispirane hydrocarbon having an odd number of carbon atoms, preferably a dispirane hydrocarbon as defined above, with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, a dispirane hydrocarbon having an odd number of carbon atoms, preferably a dispirane hydrocarbon as defined above, into the combustion chamber of said reaction type power plant in such proportion as to produce a combustible mixture, subjecting said combustible mixture to combustion, and exhausting the resulting gases from said combustion chamber so as to impart thrust thereto.

Preferably, the dispirane hydrocarbons of the present invention have an odd number of carbon atoms, either 9, 11 or 13, comprising three rings and two spiro carbon atoms, e.g., two carbon atoms which are each held in common by two cyclic rings. In copending case Serial No. 57,403, filed of even date in the name of Stanley D. Koch, are disclosed and claimed the tricyclic dispirane hydrocarbons having an even number of carbon atoms for use as fuels in reaction type power plants.

In the formula of the preferred dispirane hydrocarbons given above, $x$ is a whole number of 1 to 3 inclusive. Thus, where $x$ is 1, the dispirane hydrocarbon of this invention is dispiro[3.3.3.0]nonane having the formula

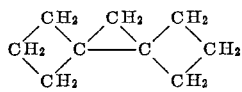

which has 9 carbon atoms in the molecule. Where $x$ is 2, the dispirane hydrocarbon of this invention is dispiro-[4.1.4.0]undecane of the formula

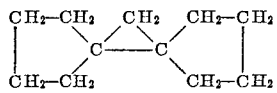

which has 11 carbon atoms. Where $x$ is 3, the dispirane hydrocarbon of this invention is dispiro[5.1.5.0]tridecane of the formula

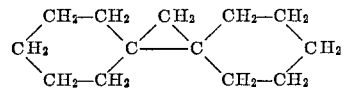

which has a total of 13 carbon atoms.

This dispirane hydrocarbons of this invention are produced by reacting a carbene, i.e., a divalent carbon intermediate, generated from methylene iodide and a zinc-copper couple with a biscycloalkylidene which is preferably obtained by condensing two moles of a cycloalkyl ketone to form a 1,1'-dihydroxybicycloalkyl which is reacted with a hydrogen halide to replace the hydroxyl groups with halo groups which are then removed by dehalogenation to form the biscycloalkylidenes. For general reactions of the carbenes, see, e.g., the papers by W. von E. Doering et al., J. Amer. Chem. Soc. 76, 6162 (1954), and W. Kirmse, Angew, Chem. 71, 537 (1959).

In the ketone condensation step, a suitable cycloalkyl ketone such as cyclobutanone, cyclopentanone, or cyclohexanone is condensed in a solvent medium, preferably benzene, in the presence of a metal catalyst, preferably a metal from group II and/or group III of the periodic table. Usually, the catalyst comprises a mixture of a metal and a metal halide, preferably either aluminum or magnesium in admixture with mercuric chloride. The condensation is initiated by heating, but after the exothermic reaction begins, the reaction mixture must be cooled externally. Preferably, the reaction is carried out at a temperature in the range of from 0° C. to 50° C. Ordinarily atmospheric pressure is used although subatmosphere or superatmosphere pressures could be used if desired. The product of this reaction step is a 1,1'-dihydroxybicycloalkyl.

In the second step of the process of this invention, the 1,1'-dihydroxybicycloalkyl is reacted with a hydrogen halide to replace each of the hydroxyl groups with halogen. Although this reaction step can be carried out at room temperature, the reaction is very exothermic and is preferably carried out at a temperature in the range of about —20° C. to 0° C. The preferred hydrogen halide is hydrogen bromide; however, the other hydrogen halides such as hydrogen chloride and hydrogen iodide can also be used. Preferably, the hydrogen halide reactant is used in the form of a concentrated aqueous acid which is saturated with the free hydrogen halide. Usually this reaction step is carried out at atmospheric pressure although subatmospheric and superatmospheric pressures could be used.

In the third step of the process of this invention the 1,1'-dihalobicycloalkyl prepared above is dehalogenated to form the biscycloalkylidene. This step is preferably carried out in an inert solvent medium in the presence of a group II metal. Glacial acetic acid is preferred solvent although other inert solvents can also be used. The group II metals may be, for example, zinc or cadmium, with zinc being preferred. The zinc is used in the form of finely divided particles or as a dust. The dehalogenation step can be carried out at room temperature and is preferably carried out at a temperature in the range of from 0° C. to 50° C. This reaction step is highly exothermic so that it is necessary to cool the reaction mixture by external cooling. Preferably the dehalogenation is carried out at atmospheric pressures although subatmospheric and superatmospheric pressures can be used.

In the first step of the process of this invention the biscycloalkylidene is reacted with a carbene generated from methylene iodide and zinc-copper couple. The zinc-copper couple is prepared by heating a mixture containing from 75% to 95% zinc and, correspondingly, from 25% to 5% copper in a hydrogen atmosphere at a temperature in the range of from 425° C. to 475° C. for a period of from 4 to 6 hours. In the formation of the zinc-copper couple, the first part of the reaction is highly exothermic and care must be taken to avoid heating the mixture much above the temperature of 475° C. Preparation of the carbene is preferably carried out in an inert solvent medium, such as, for example, anhydrous diethyl ether, tetrahydrofuran, and the like. The reaction is started conveniently by addition of a small amount of iodine to the reaction mixture; however, the reaction can be conducted without the presence of this activation iodine. The reaction is started at room temperature and after the exothermic reaction has subsided is continued at reflux temperature for a period of from 24 to 60 hours. This reaction is preferably carried out at atmospheric pressure although subatmospheric and superatmospheric pressures can be used.

The advantages, desirability, and usefulness of this invention are illustrated by the following examples.

EXAMPLE 1

In this example, dispiro[5.1.5.0]tridecane was prepared from biscyclohexylidene which was prepared from cyclohexanone. In the first step, 94.6 (3.9 g.-atoms) of magnesium was placed in a 5 liter flask which had been carefully dried and into which was placed 1 liter of freshly distilled benzene. A solution of 170 g. (0.64 mole) of mercuric chloride dissolved in 603 g. (6.15 moles) of cyclohexanone which had been dried overnight over magnesium sulfate was added slowly to the reaction flask. The reaction mixture was initiated by heating but after the initial exothermic reaction began, it was necesary to cool the reaction flask externally. The reaction mixture was heated for a period of 2 hours on a steam bath after the addition of the cyclohexanone solution was completed. At the end of this time, the solid magnesium pinacolate was broken up and 450 ml. of water added to the reaction mixture with stirring. The resulting mixture was then heated for an additional 3 hours on the steam bath with occasional stirring. Thereafter, the liquid phase in the reaction mixture was removed by filtration and the solid residue extracted twice with 400 ml. portions of benzene. The recovered liquid phase and washings were then vacuum distilled to remove the benzene. Upon cooling the pot residue of the distillation overnight, 131.6 g. of 1,1'-dihydroxybicyclohexyl precipitated out and was recovered by filtration. The product was recrystallized twice from ligroin to obtain 88.2 g. of the product having a melting point of 127.5–128.5° C.

In the second step the 1,1'-dihydroxybicyclohexyl was converted into 1,1'-dibromobicyclohexyl. The halogenation reactant was prepared by saturating 750 ml. of concentrated aqueous hydrobromic acid in a 2 liter round bottom flask with hydrogen bromide at a temperature of −10° C. to −15° C. After this solution was completely saturated, 100 g. (0.505 mole) of 1,1'-dihydroxybicyclohexyl was added in portions. The reaction was strongly exothermic and the mixture was cooled to −10° C. after each addition. Upon completion of the addition of the 1,1' - dihydroxybicyclohexyl, the reaction mixture was maintained at a temperature of from −16° C. to −10° C. for a period of 4 hours with constant stirring. At the end of this time, the product formed was recovered by filtration, washed thoroughly with cold water, digested in cold methanol, and dried on filter paper. The crude, dried product was then washed with 150 ml. of ether and filtered to yield 68 g. of the mixture of 1,1'-dibromobicyclohexyl and 1,2'-dibromobicyclohexyl. This mixture was digested four times with 200 ml. portions of a 3:1 ether-chloroform mixture and 30 g. of 1,1'-dibromobicyclohexyl crystallized from the mother liquors and separated by filtration. The product had a melting point of 128–130° C.

The 1,1'-dibromobicyclohexyl was converted into biscyclohexylidene by debromination with zinc. In this step, 50 g. (0.154 mole) of finely powdered 1,1'-dibromobicyclohexyl was suspended in a 1000 ml. Erlenmeyer flask in 500 ml. of glacial acetic acid and 25 g. (0.38 g.-atom) of zinc dust added gradually. The reaction flask was then shaken and cooled externally to keep the reaction temperature between 16° C. and 20° C. The reaction was completed in approximately 30 minutes with the separation of the biscyclohexylidene as crystals. At the end of this time, 200 ml. of petroleum ether was added to the reaction mixture and the zinc dust separated by filtration. The filtrate was then shaken with 750 ml. of water to form two layers. The petroleum ether layer containing the biscyclohexylidene was washed three times with water and dried over calcium chloride. The petroleum ether was then removed by vacuum evaporation to obtain the biscyclohexylidene as long needle crystals. The biscyclohexylidene was recrystallized from methanol to obtain 22 g. of product having a melting point of 55° C.

In the final step, the biscyclohexylidene was reacted to obtain the dispiro[5.1.5.0]tridecane using a zinc-copper couple. The zinc-copper couple was prepared from a mixture of 120 g. of zinc dust and 15 g. of cupric oxide. This admixture was placed in an eight inch Vycor boat in a ceramic combustion tube and heated in a stream of hydrogen to a temperature of 450° C. over a period of from about 90 to 100 minutes. The temperature of the mixture was carefully determined using three iron-constantan thermocouples inserted into the reaction mixture. The reaction was found to be exothermic and required very careful heating in order to prevent the temperature from going above 475° C. The contents of the Vycor boat were held at a temperature of 425° C. to 450° C. for an additional period of approximately 4 hours in the hydrogen atmosphere. At the end of this time, the mixture was permitted to cool in the hydrogen atmosphere to obtain the zinc-copper couple as a grayish powder. Reaction with the zinc-copper couple was conducted in a 500 ml. flask into which was placed 18.0 g. (0.25 g.-atom of zinc) of the zinc-copper couple, 200 ml. of anhydrous diethyl ether which had been dried over sodium, and 3.8 g. (0.015 mole) of iodine. After the disappearance of the iodine color, 67.0 g. (0.25 mole) of methylene iodide and 41.3 g. (0.25 mole) of biscyclohexylidene were added immediately. The resulting mixture was then refluxed for a period of 48 hours. At the end of this time, the reaction mixture was cooled and centrifuged to remove the finely divided metals which had precipitated. The centrifugate was then extracted three times with cold 5% hydrochloric acid, three times with 5% sodium bicarbonate, and twice with water. The organic phase obtained was then allowed to stand overnight over anhydrous calcium chloride. Thereafter, the solvent was removed under vacuum using a rotary evaporator with the pressure being lowered to 27 mm. Hg while the flask was immersed in ice water. Thereafter, 12.6 g. of dispiro[5.1.5.0]tridecane was recovered by crystallization. The product had a boiling point of 60° C./0.8 mm., a refractive index $n_D^{25}$ 1.4920 and a density $d_4^{20}$ 0.918 g./ml. Analysis of the product was found to be 88.0% carbon and 12.3% hydrogen as compared wtih calculated values of 87.6% carbon and 12.4% hydrogen.

A nuclear magnetic resonance spectrum was determined on the product at an RF frequency of 40 mc., field of 9400 gauss, using water as a reference. Two peaks were found, one at +3.38 p.p.m. attributed to methylene protons from a 6-membered carboxylic ring and one at +4.81 p.p.m. attributed to methylene protons from a 3-membered carboxylic ring.

The dispirane product was also examined by a high resolution infrared spectrum with a lithium fluoride prism over the range of 2700 to 3200 cm.$^{-1}$. Bands at 2855 and 2926 cm.$^{-1}$ exactly duplicated those in a reference determination on cyclohexane and were attributed to the C-H bond on a cyclohexane ring. One additional band was found at 3035 cm.$^{-1}$, which agrees with the value for the methylene group in cyclopropane.

EXAMPLE 2

In this example, dispiro[5.1.5.0]tridecane was subjected to inspection tests in order to show the thermal and physical properties of a typical dispirane hydrocarbon having an odd number of carbon atoms and the suitability of these hydrocarbons in the operation of reaction type power plants. The results of these tests are given in Table I.

*Table I*

THERMAL AND PHYSICAL PROPERTIES OF DISPIRO [5.1.5.0]TRIDECANE FUELS

| | |
|---|---|
| Hydrogen/carbon ratio | 0.141 |
| Boiling point, ° C./0.8 mm ° C | 60 |
| Index of refraction, $n_D^{20}$ | 1.4920 |
| Density, $d_4^{20}$, g./ml | 0.918 |
| Heat of combustion, B.t.u./lb., net | 18,263 |
| Heat of combustion, B.t.u./gal., net | 140,400 |
| Thermal decomposition temp., ° F | 680 |

Heats of combustion were obtained with a Parr oxygen bomb calorimeter on both a weight and a volume basis following the ASTM D-240-57T procedure. Density was determined using a Lipkin bicapillary pycnometer.

The thermal decomposition temperature was obtained using a high temperature, high pressure isoteniscope which consists of a monel bomb capped on one end and connected to a precision pressure gage by a Monel diaphragm. The test fuel was heated within the bomb to an elevated temperature under high pressure and the temperature was measured at which the fuel began to decompose and evolve gas as determined by the changes of pressure within the bomb. In this method, the formation of deposits in the decomposition reaction is not measured because some fuels may start to decompose to gas before forming deposits.

The above examples indicate that the dispirane hydrocarbons of this invention having an odd number of carbon atoms are very suitable for use in various reaction type power plants. These dispirane hydrocarbons have particularly high heats of combustion on a volume basis and may therefore be very advantageously employed in jet propulsion type engines and turbine type engines where extremely high energy contents are desirable. Another advantage in utilizing the dispirane hydrocarbons of this invention as reaction type power plant fuels is that they have very high boiling points. It is very desirable to have a fuel with a high boiling point for use in aircraft type engines where the engines encounter low pressures at high altitudes, resulting in loss of large amounts of fuel by vaporization unless the fuel system is fully pressurized.

The dispirane hydrocarbons of this invention are also characterized by unusually high thermal stabilities when employed as fuels for reaction type power plants. This factor is of importance not only in the actual combustion taking place in the engine but also in the fuel system prior to the burning step. For example, it is necessary in high speed aircraft to use a fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone. It is believed that the dispirane hydrocarbons of this invention have particularly high thermal stabilities because of the absence of any tertiary hydrogen atoms in these compounds.

In operating reaction type power plants with the dispirane hydrocarbon fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet, and gas turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or another chemical oxidizer, for example, fuming nitric acid, hydrogen peroxide, fluorine or the like, in guided missile and rocket applications. In some applications, a mixture of oxidizing agents will also be useful.

The dispirane fuel compositions of the present invention may be blended with other materials such as gasoline, kerosene, mixtures of gasoline and kerosene, other aviation fuels, and with the present hydrocarbon jet fuels to produce an improved fuel over the presently available fuels. More particularly, the fuels described herein may be added to the present aliphatic hydrocarbon jet fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be depended not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) dispirane hydrocarbons having an odd number of carbon atoms as new compounds, (2) methods for preparing the dispirane hydrocarbons having an odd number of carbon atoms, (3) high energy fuel compositions containing said dispirane hydrocarbons having an odd number of carbon atoms as an essential ingredient, (4) improved methods of developing thrust, and (5) methods of operating reaction type power plants.

I claim:

1. The method of developing thrust in a reaction chamber which comprises oxidizing in said chamber a hydrocarbon fuel comprising essentially a dispirane of the formula

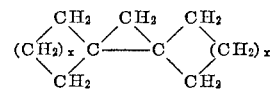

wherein $x$ is an integer of from 1 to 3, to produce a mass of high temperature gases and exhausting said gases from the reaction chamber in a manner so as to develop a high thrust.

2. The method of operating a reaction type power plant which comprises injecting into the combustion chamber of said power plant a stream of an oxidizing gas and a stream of a hydrocarbon fuel comprising essentially a dispirane of the formula

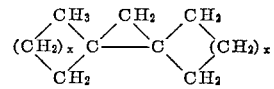

wherein $x$ is an integer of from 1 to 3, oxidizing said fuel in said chamber, and exhausting the resulting gases from said chamber so as to impart thrust.

3. The method of operating a jet-propulsion engine which comprises injecting into the combustion chamber of the engine a stream of an oxidizing agent and a stream of a hydrocarbon fuel comprising essentially a dispirane of the formula

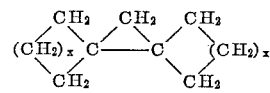

wherein $x$ is an integer of from 1 to 3, oxidizing said fuel in said chamber, and exhausting the resulting gases in a rearward direction from said combustion chamber so as to impart thrust to said engine.

4. The method of operating a gas turbine engine which comprises injecting into the combustion chamber of the engine a stream of an oxidizing agent and a stream of a hydrocarbon fuel comprising essentially a dispirane of the formula

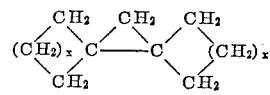

wherein $x$ is an integer of from 1 to 3, oxidizing said fuel and exhausting the resulting gases from said combustion chamber through a turbine to develop motive power.

5. The method of operating a turbo-jet engine which comprises injecting into the compustion chamber of the engine a stream of air and a stream of a hydrocarbon fuel comprising essentially a dispirane of the formula

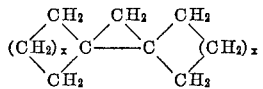

wherein $x$ is an integer of from 1 to 3, burning the fuel in said chamber, exhausting the resulting gases from said chamber through a turbine to expand the same and compress the air supplied to said chamber, and passing the gases into the atmosphere by way of a nozzle to impart thrust to said engine.

6. The method of operating a turbo-jet engine which comprises injecting into the combustion chamber of said chamber a stream of air and a stream of a dispirane of the formula

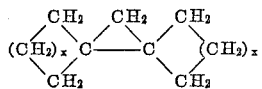

wherein $x$ is an integer of from 1 to 3, burning the dispirane in said chamber, exhausting the resulting gases from said chamber through a turbine to expand the same and compress the air supplied to said chamber, and passing the gases into the atmosphere by way of a nozzle to impart thrust to the engine.

7. The method defined in claim 6 further limited in that the dispirane is dispiro[5.1.5.0]tridecane.

References Cited in the file of this patent

UNITED STATES PATENTS

| | | |
|---|---|---|
| 2,331,596 | Campbell | Oct. 12, 1943 |
| 2,514,546 | Ipatieff et al. | July 11, 1950 |
| 2,765,617 | Gluesenkamp et al. | Oct. 9, 1956 |
| 2,826,037 | Scott et al. | Mar. 11, 1958 |

OTHER REFERENCES

Hackh's Chemical Dictionary, 3rd ed. (1950), pages 166, 241, 534, The Blakiston Co., Philadelphia, Pa.